US007000946B2

(12) United States Patent
Kincaid et al.

(10) Patent No.: US 7,000,946 B2
(45) Date of Patent: Feb. 21, 2006

(54) TEMPERATURE COMPENSATED AIR BAG CONTROL SYSTEM

(75) Inventors: Kevin D. Kincaid, Kokomo, IN (US); David R. Little, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 64 days.

(21) Appl. No.: 10/348,356

(22) Filed: Jan. 21, 2003

(65) Prior Publication Data

US 2004/0140654 A1 Jul. 22, 2004

(51) Int. Cl.
*B60R 21/32* (2006.01)

(52) U.S. Cl. .................................................... 280/735

(58) Field of Classification Search ................ 280/735, 280/734, 740, 741, 742, 738
See application file for complete search history.

(56) References Cited

U.S. PATENT DOCUMENTS 4,765,565 A * 8/1988 Buchele-Buecher et al. ..... 244/3.22
5,366,242 A * 11/1994 Faigle et al. ................ 280/736
5,413,378 A * 5/1995 Steffens et al. ............. 280/735
5,460,405 A * 10/1995 Faigle et al. ................ 280/735
5,489,806 A * 2/1996 Harris et al. ............... 307/10.1
5,613,702 A * 3/1997 Goetz ......................... 280/735
5,626,359 A * 5/1997 Steffens et al. ............. 280/735
5,697,639 A * 12/1997 Vogel ......................... 280/735
5,722,687 A 3/1998 Cook, Jr. et al.
5,801,619 A 9/1998 Liu et al.
5,965,952 A * 10/1999 Podoloff et al. ........... 307/10.1
6,144,246 A * 11/2000 Wachter ..................... 327/513
6,161,866 A 12/2000 Ryan et al.
6,196,582 B1 3/2001 Sparkman et al.
6,247,726 B1 6/2001 Ryan
6,396,249 B1 5/2002 Itakura et al.
6,431,596 B1 8/2002 Ryan et al.
6,550,807 B1 * 4/2003 Faigle et al. ................ 280/739
6,588,796 B1 7/2003 Webber et al.
6,619,692 B1 * 9/2003 Van Wynsberghe et al. ..... 280/741
2004/0120382 A1 * 6/2004 Bennett et al. ............... 374/45

FOREIGN PATENT DOCUMENTS

DE 198 10 537 9/1999
DE 101 07 273 8/2002
JP 09048319 A * 2/1997
JP 10 132601 5/1998

* cited by examiner

*Primary Examiner*—Faye M. Fleming
(74) *Attorney, Agent, or Firm*—Stefan V. Chmielewski

(57) ABSTRACT

An air bag restraint system and control system for controlling an air bag in a vehicle and compensating for ambient temperature variations. The control system includes a temperature sensor for sensing temperature of an air bag device, and an air bag controller for controlling actuation of an air bag. The controller controls restraining force produced by the air bag as a function of the sensed temperature. Accordingly, the air bag compensates to changes in temperature so as to optimize the air bag performance.

19 Claims, 4 Drawing Sheets

TEMPERATURE COMPENSATED AIR BAG CONTROL SYSTEM

TECHNICAL FIELD

The present invention generally relates to vehicle installed air bag restraint devices and, more particularly, relates to a control system for controlling an air bag restraint system.

BACKGROUND OF THE INVENTION

Passenger automotive vehicles are commonly equipped with air bag restraint devices for mitigating potential injuries to vehicle occupants for certain types of vehicle accidents. For example, front impact air bags are frequently installed in the steering column and dash in the front of passenger vehicles, while side impact air bags are side mounted on the roof rail. Automotive air bag systems typically include an initiator, such as an ignitor, for actuating a pyrotechnic charge which generates gas, such as nitrogen, to inflate the air bag. Vehicle crash sensors, such as accelerometers, are typically used to detect the onset of an accident. The sensed signals are processed to predict the occurrence of certain crash events which are severe enough to warrant the activation of the air bag. The air bag is electronically deployed to provide a restraining force for the vehicle occupant.

The air bag restraining force should be sufficient to counteract the kinetic energy of the occupant to slow the occupant down so that the occupant's velocity is substantially matched to that of the vehicle before the occupant impacts the vehicle interior. Air bag restraint systems can be designed to operate over a wide range of vehicle conditions. These conditions may include a range of speeds, passenger sizes, seating positions, and the presence of belted or unbelted occupants, all of which may affect the air bag design requirements. Higher velocity speeds and larger passengers result in a larger kinetic energy and, thus, generally require greater opposing restraining forces. Smaller occupants and occupants seated close to the steering wheel generally require lower restraining forces.

To accommodate the above-described conditions, the amount of restraining force generated by the air bag may need to be varied in order to optimize the air bag performance. The amount of restraining force that the air bag applies is a function of both the mass of gas filling the air bag and the size of any vent holes. Additionally, the ambient temperature of the inflator module affects the temperature of the gas filling the air bag. The gas is significantly cooled as it passes through the various screens and the output ports of the inflator. Lower ambient temperatures can reduce the resultant gas pressure which creates a corresponding reduction in the generated restraining force. As a consequence, the amount of restraining force generated by a conventional air bag may vary as a function of the ambient temperature of the inflator.

It is therefore desirable to provide for an air bag system in a vehicle which compensates for ambient temperature variations associated with the air bag. In addition, it is desirable to provide for an air bag control system which compensates for the ambient temperature conditions so as to optimize performance of the air bag over a wide temperature range.

SUMMARY OF THE INVENTION

In accordance with the teachings of the present invention, an air bag system and a control system for controlling an air bag in a vehicle are provided which compensate for ambient temperature variations so as to optimize air bag performance. The control system includes a temperature sensor for sensing temperature of an air bag device, and an air bag controller for controlling actuation of an air bag in a vehicle. The controller controls restraining force produced by the air bag as a function of the sensed temperature. Thus, the air bag compensates to changes in temperature so as to optimize the air bag performance.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
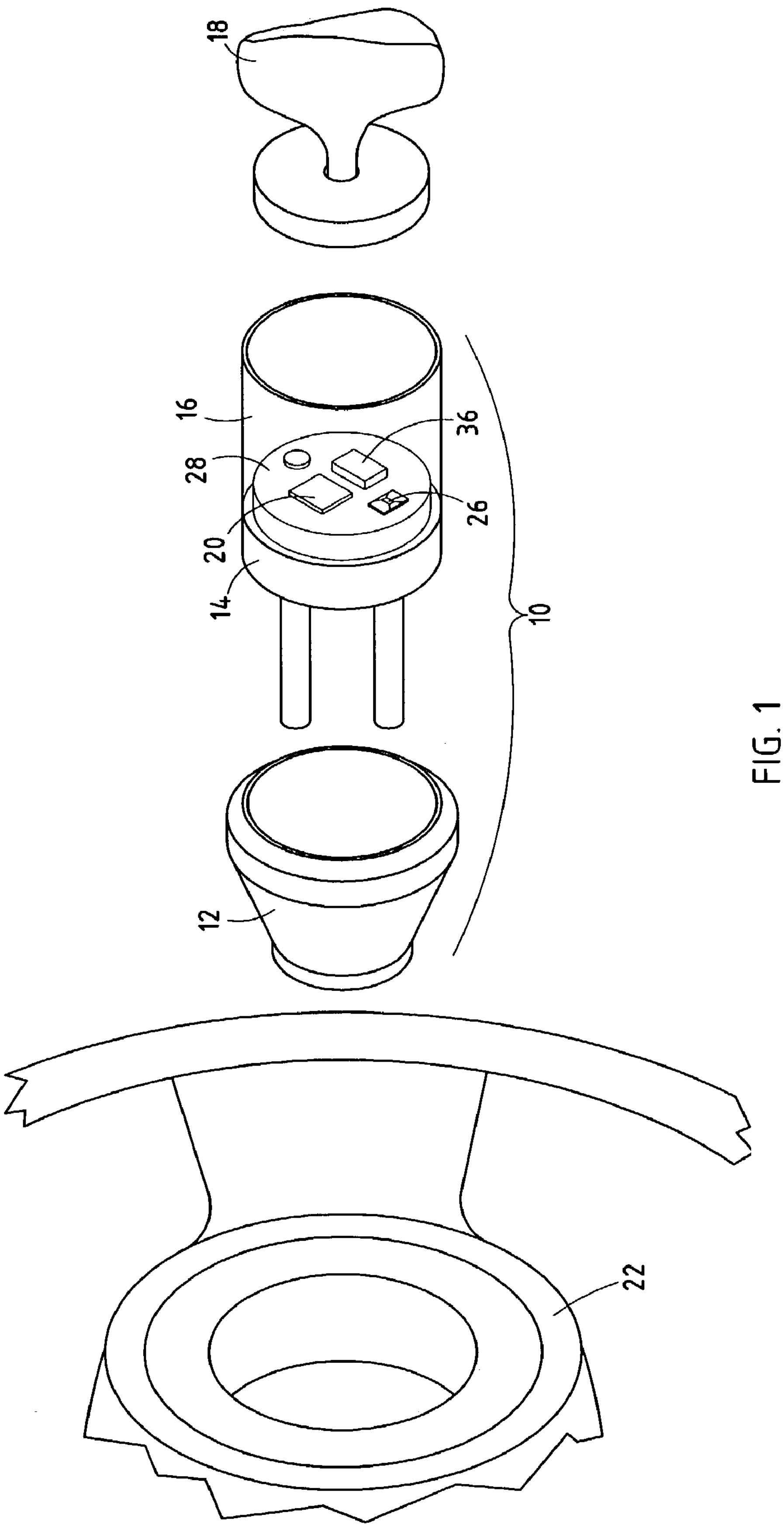
FIG. 1 is an exploded perspective view of an air bag restraint system installed in a vehicle.

Referring to FIG. 1, an air bag restraint system is generally shown having an initiator 10 and an air bag 18 installed in the steering column 22 of a vehicle, such as an automotive passenger vehicle. The air bag restraint system may be conventionally mounted within the steering wheel column 22 to apply, upon actuation, a restraining force to the driver of the vehicle in the event of certain detected conditions indicative of a vehicle collision, or may be otherwise mounted, such as in the dash in front of a passenger, or in the side roof rail for a side impact air bag. The initiator 10 provides electronic controls and a pyrotechnic charge for filling the air bag with gas (e.g., nitrogen) to create a restraining force to oppose the kinetic energy of the occupant. It should be appreciated that various types of air bag initiators may be employed in connection with the present invention.

The initiator 10 shown and described herein is also referred to as a "smart ignitor" which generally includes control electronics formed in an integrated circuit, such as an application specific integrated circuit (ASIC) 20, shown assembled on top of a substrate 28. The smart ignitor (initiator) 10 further includes an energy storage device 36, a thin film bridge element 26, and a pyrotechnic charge provided in a charge canister 16. The substrate 28 supporting the control ASIC 20, energy storage device 36, bridge element 26, and charge canister 16 are generally shown assembled on top of a header 14 which is inserted into a base 12. It should be appreciated that the components of the initiator 10 may be packaged in various arrangements. The air bag initiator 10 receives control signals from a central control module (see FIG. 2) which may include a stand alone controller or may be integrated with one or more other vehicle controllers. The central control module senses dynamic characteristics of the vehicle via one or more sensors (not shown) and determines when certain vehicle impacts (crashes) occur. This may include the use of one or more sensors such as accelerometers for detecting a front impact vehicle collision or a side impact vehicle collision. The processing of sensed signals to determine such collisions for controlling an air bag restraint system are well-known to those skilled in the art.

Figure 2:
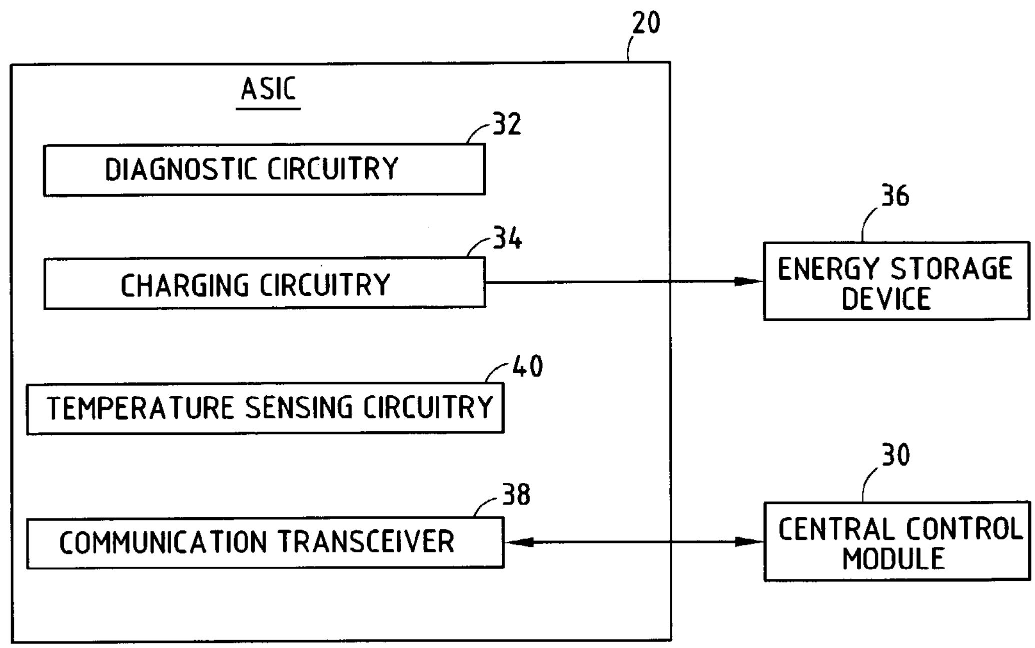
FIG. 2 is a block diagram of a control system for controlling the air bag restraint system.

The control ASIC 20 includes integrated circuitry formed on a substrate (die) for providing various functions, such as those shown in FIG. 2. The control ASIC 20 may include diagnostic circuitry 32, charging circuitry 34, a communication transceiver 38, and temperature sensing circuitry 40. The communication transceiver 38 allows for communication with various other devices including central control module 30 and various sensors (not shown). The charging circuitry 34 controls charging of an energy storage device 36, which is shown separate from the ASIC 20. However, energy storage device 36 may be found on ASIC 20. The energy storage device 36 may include a capacitor for storing energy, with the charging circuitry controlling the voltage applied to the capacitor. The energy storage device 36 stores a sufficient charge to generate a large current in bridge element 26 sufficient to ignite the pyrotechnic compound.

The present invention employs temperature sensing circuitry 40 to sense the ambient temperature of the air bag inflator 10. Since the initiator 10 is mounted within the air bag inflator module, the die temperature of the control ASIC 20 provides a good indicator of the ambient temperature of the air bag inflator 10. The temperature sensing circuitry 40 may be embedded in the control die 28 and temperature information can be transmitted via the communication transceiver 38 to the central control module 30 along with other diagnostic status information. The information received by the central control module 30 can be used with an appropriate control mechanism to adjust the amount of gas generated and inflated into the air bag, and may compensate for the ambient temperature affect on the resulting restraining force. Thus, by sensing ambient temperature of the air bag initiator 10, the present invention is able to control the resulting restraining force as a function of the sensed temperature so as to compensate for temperature-based variations.

Figure 3:
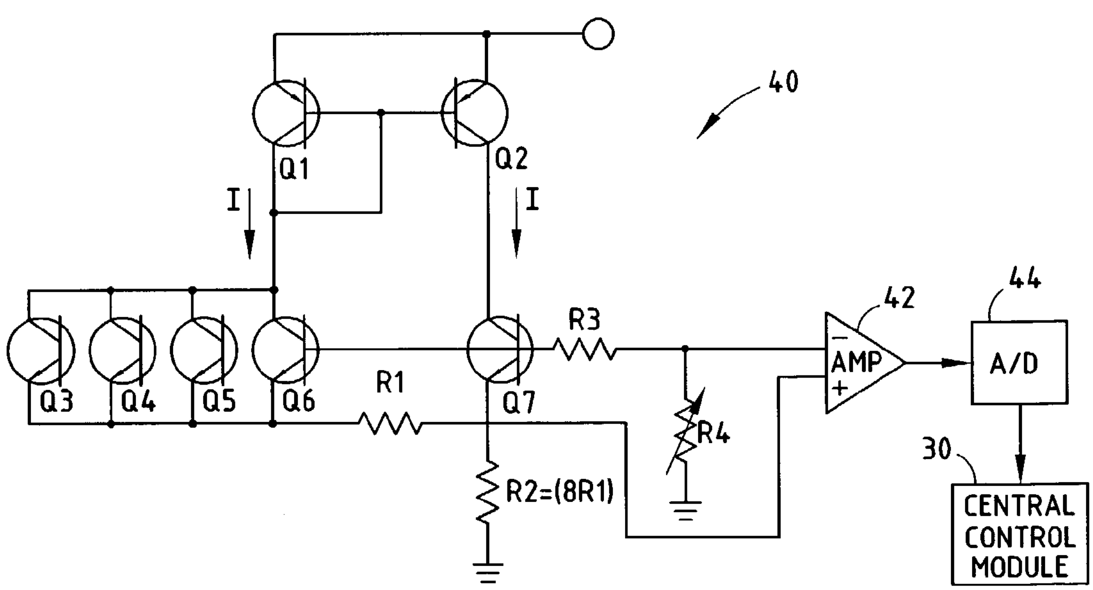
FIG. 3 is a circuit diagram illustrating a transistor-based temperature measurement circuit for sensing temperature of the air bag initiator, according to a first embodiment.

A first embodiment of the temperature measurement circuitry 40 is illustrated in FIG. 3 made up of a plurality of transistors Q1–Q7, resistors R1–R4, and amplifier 42. Transistors Q1 and Q2 are configured as a current mirror to provide an equal amount of current I to transistors Q3–Q6 and transistor Q7. If the area of transistors Q3–Q6 and Q7 are equal, such that the current density for transistors Q3–Q6 is one-quarter of the current density of transistor Q7, the difference in current density causes a corresponding difference in the base emitter voltage drops. The base emitter voltage drop of transistors Q3–Q6 for silicon devices will be about 36 mV less than the base emitter voltage drop of transistor Q7 at a temperature of twenty-five degrees Celsius (25° C.), with a positive temperature coefficient of 0.12 mV/° C. Accordingly, a 36 mV differential will be developed across resistor R1. With resistor R2 having a value eight times greater than resistor R1, the voltage drop across resistor R2 will be sixteen times the voltage drop across resistor R1 for the value shown. The voltage across resistor R2 will have a positive temperature coefficient of 1.9 mV/° C. This positive temperature coefficient is almost exactly matched to the negative temperature coefficient ($T_c$) of the base emitter voltage of transistor Q7. The sum of the voltage drop across resistor R2 and the voltage drop across the base emitter junction of transistor Q7 produces a zero temperature coefficient $T_c$ reference voltage at the base of transistor Q7.

The amplifier (AMP) 42 amplifies the voltage differential between the base and emitter of transistor Q7, thus producing an output voltage that is proportional to the temperature of the die. An amplifier gain of twenty produces an output voltage swing of approximately five volts for a temperature swing of one hundred twenty-five degrees Celsius (125° C.), which represents a typical automotive temperature range of negative forty degrees Celsius (−40° C.) to eighty-five degrees Celsius (85° C.). Additionally, resistors R3 and R4 allow the output voltage to be trimmed to zero volts at a specific temperature by using a resistive trimming process which should be evident to those skilled in the art.

The output of the amplifier 42 is shown connected to an analog-to-digital (A/D) converter 44 for converting the analog voltage output to a digital signal. The A/D converter 44 could be configured using multiple comparators with various thresholds. The digital output signal from the A/D converter 44 is shown transmitted serially to the central control module 30 for processing to generate an air bag control signal which compensates for the sensed ambient temperature variations.

Figure 4:
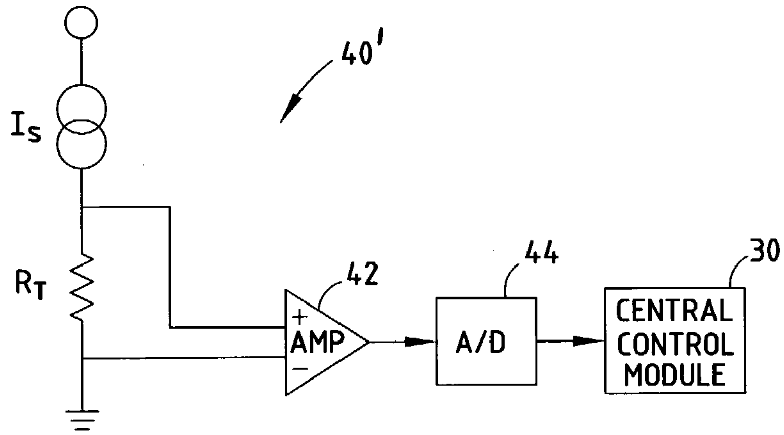
FIG. 4 is a circuit diagram illustrating a thermistor-based temperature measurement circuit for sensing temperature of the air bag initiator, according to a second embodiment.

Thermistor-based temperature measurement circuitry 40' for sensing ambient temperature of the air bag initiator is shown in FIG. 4, according to a second embodiment of the present invention. The thermistor-based temperature measurement circuitry 40' includes a thermistor $R_t$ for sensing temperature, and a constant current power source $I_s$ for producing a voltage across the thermistor $R_t$ that is proportional to the temperature. The voltage produced across thermistor $R_t$ is normalized by amplifier (AMP) 42. The output of amplifier 42 is shown connected to an A/D converter 44 for digitizing the analog signal. The digitized output is then transmitted as serial data to the central control module 30, as described above.

Accordingly, temperature of the air bag initiator 10 or other air bag device may be sensed with the use of the transistor-based temperature measurement circuitry 40 according to one embodiment, or the thermistor-based temperature measurement circuitry 40' according to another embodiment. While transistor-based and thermistor-based temperature measurement circuitry 40 and 40' are shown and described herein, it should be appreciated that other types and configurations of temperature sensing circuitry may be employed to sense temperature of a component of the air bag for use in connection with the present invention, without departing from the teachings of the present invention.

The central control module 30, or other signal processing device, performs a control routine which uses the sensed temperature to control the amount of restraining force generated by the air bag restraint system to compensate for temperature variations. The ambient temperature of the air bag system, particularly the inflator module, affects the temperature of the gas filling the air bag. In effect, the gas is significantly cooled as it passes through various screens and output ports (not shown) of the air bag initiator 10. Lower ambient temperatures tend to reduce the resulting gas pressure in the air bag, thus creating a corresponding reduction in the restraining force. By employing the sensed ambient temperature, the resulting variability in the air bag restraint system performance is controlled.

The control routine for controlling the air bag restraining force based on temperature may vary depending on the type of air bag restraint system which may include multi-stage air bags with fixed venting, single-stage air bags with variable venting, and other types of controlled air bag restraint systems. In a multi-stage air bag restraint system having six output stages (stage 0–5) for generating varying amounts of gas, the control routine may provide course adjustment of the air bag restraining force by selecting the appropriate stage as shown in the following table.

Temperature Compensation - Multi-Stage, Fixed Venting

| Condition | Air Bag Output Level | | | |
|---|---|---|---|---|
| Uncompensated | Stage 1 | Stage 2 | Stage 3 | Stage 4 |
| Compensated −40° C. | Stage 2 | Stage 3 | Stage 4 | Stage 5 |
| Compensated +25° C. | Stage 1 | Stage 2 | Stage 3 | Stage 4 |
| Compensated +105° C. | Stage 0 | Stage 1 | Stage 2 | Stage 3 |

This provides for course adjustment of the amount of gas inflated into the air bag depending on three temperature compensated ranges. Also shown is an uncompensated range with the air bag output level having four selectable stages 1–4 which may be selected according to known air bag control routines that vary depending on vehicle speed, size of the occupant, seating position, belted or unbelted occupant, and other characteristics as are known in the art. According to the present invention, the air bag output level is further adjusted as a function of the sensed ambient temperature by selecting an appropriate stage dependent on the sensed temperature.

The control routine may alternately be configured to provide control of a venting mechanism in a multi- or single-stage system having adjustable venting. Air bag restraint systems that include the use of a controlled venting mechanism typically calculate the amount of output gas required for sufficient occupant restraint. This calculation may factor in various parameters including occupant mass, seat belt usage, crash severity, occupant position, and other characteristics. The central control module 30 may activate sufficient air bag stages to generate excess gas output based upon the sensed ambient temperature, according to the present invention. To vent excess gas, the venting mechanism is activated to vent the excess gas and, thus, inflate the desired amount of gas into the air bag. The venting control may accommodate either a fixed vent size open for a variable time, or a variable vent size open for a fixed time.

Figure 5A:
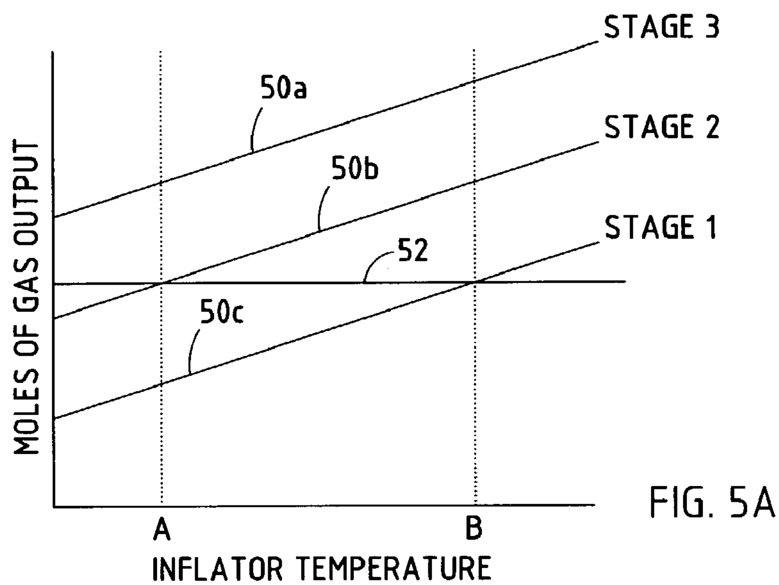
FIGS. 5A and 5B are graphs illustrating gas output and excess gas to be vented as a function of inflator temperature according to a variable venting air bag embodiment.
Figure 5B:
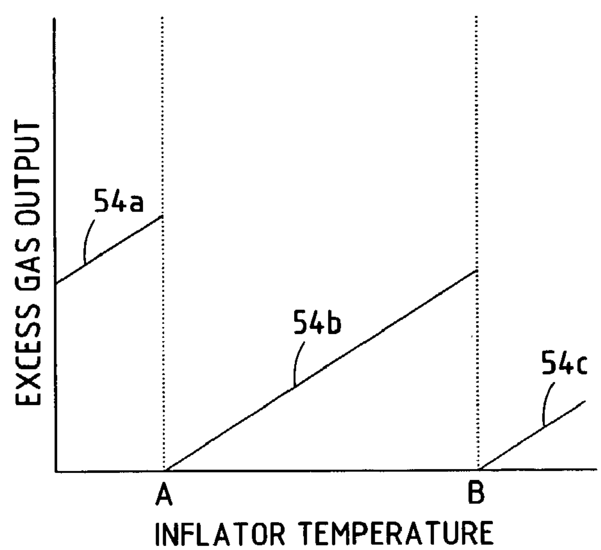

The control routine may adjust the amount of venting in a vent-type air bag restraint system according to the examples shown in FIGS. 5A and 5B. Referring particularly to FIG. 5A, gas output generated for three stages of a multi-stage, variable venting air bag restraint system are shown by lines 50*a*–50*c* as a function of inflator temperature, as compared to a desired level shown by line 52. The amount of excess gas that must be vented is shown by lines 54*a*–54*c* in FIG. 5B. The central control module 30 activates the venting mechanism at the appropriate time to divert the excess gas produced away from the inflator output port so as to limit the amount of gas that enters the air bag to the desired level.

Figure 6A:
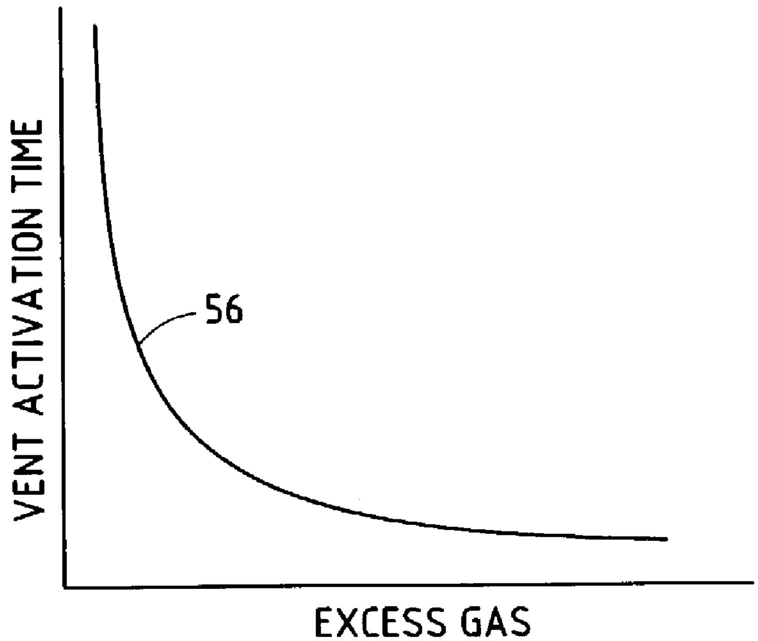
FIGS. 6A and 6B are graphs illustrating vent activation as a function of excess gas for normally closed and normally open vent air bag systems, respectively.
Figure 6B:
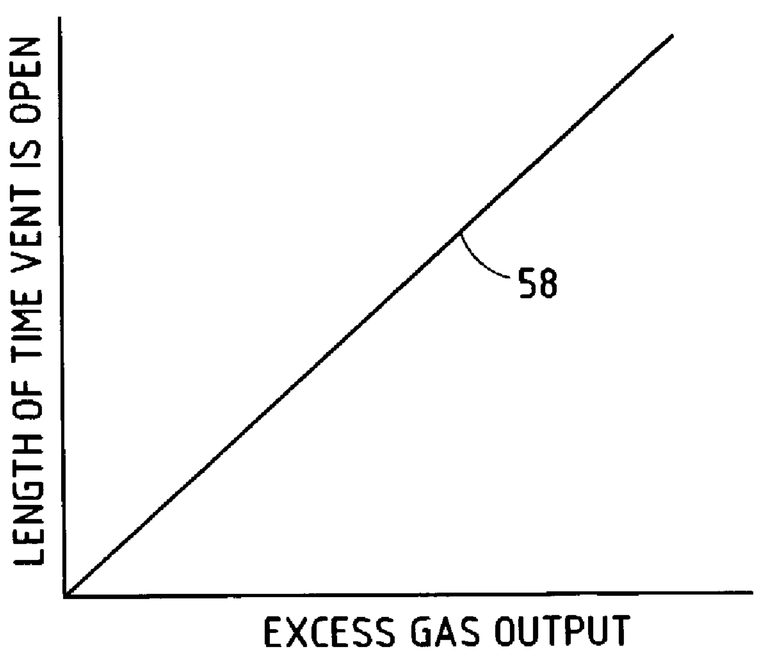

The central control module 30 may control either a normally closed or normally open venting system. For a normally closed system, the time until the vent is activated (vent opened) is inversely proportional to the amount of excess gas expected, as shown by line 56 in FIG. 6A. For a normally open system, the length of time the vent is active (vent open) is indirectly proportional to the amount of excess gas produced, as shown by line 58 in FIG. 6B.

The control routine controls the amount of output gas to provide sufficient restraint for an actual gas event in a three-stage air bag system with variable venting. The desired amount of output gas is shown by lines 52. The control routine then determines which stage to deploy based on both the desired amount of gas output and the ambient temperature of the air bag inflator. The control routine further selects the stage that generates a quantity of gas output that is greater than, but closest to the desirable output level. For the example shown, the selected output stage may be as follows:

| Temperature | Stage Selected |
|---|---|
| Temp < A | 3 |
| A < Temp < B | 2 |
| Temp > B | 1 |

The control routine determines the amount of excess output gas that will be produced by the system if the air bag inflator were not vented. A value of excess output gas is calculated by subtracting the desired amount of gas output from the actual amount of output gas produced from the selected output stage at the given temperature.

Accordingly, the present invention senses the temperature of a component, such as the initiator, of an air bag restraint system and adjusts the restraining force generated by the air bag system so as to compensate for temperature variations. While the present invention is shown having two embodiments of temperature sensing circuitry, and a central control module 30 and control routine for adjusting the variability of the restraining force according to several examples, it should be appreciated that other temperature sensing techniques and other control routines for adjusting the restraining force may be used without departing from the teachings of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A temperature compensated air bag control system for controlling an air bag on a vehicle, said control system comprising:

a temperature sensor for sensing temperature of an air bag device; and an air bag controller for controlling actuation of an air bag in a vehicle, wherein the controller controls restraining force produced by the air bag as a function of the sensed temperature, and wherein the air bag has a venting mechanism and the controller controls the length of time the venting mechanism is open to vary the amount of gas inflated into the air bag by venting excess gas with the venting mechanism.

2. The air bag control system as defined in claim 1, wherein the controller varies an amount of gas inflated into the air bag as a function of the sensed temperature.

3. The air bag control system as defined in claim 1, wherein the air bag device comprises an air bag inflator assembly.

4. The air bag control system as defined in claim 1, wherein the temperature sensor comprises temperature sensing circuitry.

5. The air bag control system as defined in claim 4, wherein the temperature sensing circuitry is formed on an integrated circuit.

6. The air bag control system as defined in claim 4, wherein the temperature sensing circuitry comprises a current mirror and temperature sensitive transistors.

7. The air bag control system as defined in claim 4, wherein the temperature sensing circuitry comprises a thermistor.

8. An air bag restraint system for a vehicle, said air bag restraint system comprising:

an air bag;

an inflator assembly for inflating gas into the air bag;

a temperature sensor for sensing temperature of the inflator assembly, wherein the temperature sensor senses temperature of an air bag initiator; and a controller for controlling actuation of the air bag, wherein the controller controls restraining force produced by the air bag as a function of the sensed temperature.

9. The air bag restraint system as defined in claim 8, wherein the controller varies an amount of gas inflated into the air bag as a function of the sensed temperature.

10. The air bag restraint system as defined in claim 9, wherein the air bag has a venting mechanism, wherein the controller varies the amount of gas inflated into the air bag by venting excess gas with the venting mechanism.

11. The air bag restraint system as defined in claim 8, wherein the temperature sensor comprises temperature sensing circuitry.

12. The air bag restraint system as defined in claim 11, wherein the temperature sensing circuitry is formed on an integrated circuit.

13. The air bag restraint system as defined in claim 11, wherein the temperature sensor circuitry comprises a current mirror and temperature sensitive transistors.

14. The air bag restraint system as defined in claim 11, wherein the temperature sensor circuitry comprises a thermistor.

15. A method of controlling an air bag in a vehicle, said method comprising the steps of:

sensing temperature of an air bag device;

sensing a crash event of a vehicle;

initiating deployment of the air bag upon sensing the crash event by generating gas; and controlling the amount of restraining force produced by the air bag as a function of the sensed temperature by varying an amount of the gas inflated into the air bag, wherein the gas is varied by venting excess gas with a venting mechanism and controlling the length of time the venting mechanism is open.

16. The method as defined in claim 15, wherein the step of controlling a restraining force comprises varying an amount of gas inflated into the air bag as a function of the sensed temperature.

17. The method as defined in claim 15, wherein said step of sensing temperature comprises sensing temperature with sensing circuitry on an integrated circuit.

18. The air bag control system as defined in claim 1, wherein the temperature sensor senses temperature of an air bag initiator.

19. The method as defined in claim 15, wherein the step of sensing temperature comprises sensing temperature of an air bag initiator.

* * * * *